Nov. 3, 1953

H. REESE, JR 2,658,173

VIBRATING CONDENSER CONVERTER

Filed Nov. 30, 1949

*INVENTOR.*
HARRY REESE JR.

BY *Arthur H. Christenson*

ATTORNEY.

Patented Nov. 3, 1953

2,658,173

UNITED STATES PATENT OFFICE 2,658,173

VIBRATING CONDENSER CONVERTER

Harry Reese, Jr., Oak Ridge, Tenn., assignor to Minneapolis-Honeywell Regulator Company, Minneapolis, Minn., a corporation of Delaware Application November 30, 1949, Serial No. 130,285

4 Claims. (Cl. 317—250)

The general object of the present invention is to provide an improved condenser for use under conditions in which the potential difference between the condenser plates is very small, and in which it is highly desirable to stabilize the potential difference between the associated condenser plates which is not created by a voltage source connected across the plates, but is due to a difference in the work functions of the different plates, and is ordinarily referred to as "contact potential." My improved condenser was primarily devised for use as a vibrating electrometer condenser, employed to convert a minute unidirectional voltage into an alternating current voltage preparatory to its amplification and measurement in electrometer apparatus of the character disclosed and claimed in the concurrently filed application of James C. Mouzon, Serial No. 130,275, and adapted to measure unidirectional electric currents of the order of $10^{-16}$ ampere.

To measure such a minute unidirectional electric current, it is practically essential to convert the current into an alternating current signal and then amplify that signal in electronic amplifying apparatus of the alternating current type. It is practically impossible to use direct current type electronic amplifiers in amplifying very small electrical quantities because of the measurement errors caused by the electronic valve "drift," or instability, inherent in such use of a direct current amplifier. In measuring a small electrical unidirectional current, such as a current due to small changes in thermocouple voltages, it is now common and successful practice to first convert the current into alternating current in conversion apparatus of the widely used type of vibratory contact mechanism disclosed in the Wills Patent 2,423,540, of July 8, 1947. That mechanism can not be used, however, in measuring the very much smaller currents measured with the use of the present invention, because the contact resistance of the vibrating contact type of converters is too high to be broken down by, and to pass, the very minute currents which can be measured with apparatus including the present invention.

It is practically possible, however, to convert such a small unidirectional current into an alternating current in a vibrating conversion condenser in which the unidirectional current puts a charge on a condenser, and in which one plate of the condenser is moved toward and away from the other plate at a suitable frequency, which, with the present invention, may well be 60 cycles per second or higher. For the use of such a conversion condenser in measuring very minute currents, the condenser plates must be spaced quite closely to one another, and must have their surfaces smooth and especially prepared to minimize risk of engagement of one plate with the other and to minimize variations in condenser contact potential. The "contact potential" of a condenser depends upon the characteristics of the condenser plates which are known as their work functions.

The work function of a condenser plate is proportional to the amount of energy required to effect the escape of a "free" electron from the surface of the plate, and appears to depend on the composition and physical characteristics of a thin surface layer of the plate, and is not constant. At the present time it appears to be practically impossible to make two condenser plates so similar that their work functions will be, and remain, equal so that the condenser including the plates will be free from contact potential effects. In practice, the existence and magnitude of the contact potential of a condenser would be relatively unimportant, if it did not vary or "drift," since it is comparatively easy to provide compensation in a measuring circuit network for any given condenser contact potential. In practice, however, the contact potential of a condenser appears to vary throughout the working life of the condenser.

The bodies of the plates of a vibratory condenser are customarily made of steel or brass, and if made of brass, the plate is nickel plated, and it has been customary, heretofore, to plate or coat the smoother surfaces of the steel or nickel plated brass plates with gold, as the gold surface layer reduces the variations in the work functions of the plates.

The specific object of the invention is to provide a condenser plate with a metallic coating, which is easy to apply and cheaper than a gold coating and is better adapted to minimize variations in the contact potential of the condenser. I attain the objects of my invention by plating the condenser plates with rhodium. I have discovered that the use of rhodium as a coating or plating material for condenser plates is advantageous because of its comparative cheapness, and because of the comparative ease with which it can be applied to the plates, and because the variation in work function of rhodium appears to be smaller than for any other metal. Moreover, the thermionic and photoelectric work functions of rhodium appear to be in excellent agreement.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the vibrating condenser converter illustrated schematically, by way of illustration and example, in the accompanying drawings, A designates a horizontal stationary condenser plate, and B represents a movable condenser plate parallel to the plate A, and vertically movable toward and away from the latter. As diagrammatically shown, the plate A is rigidly connected to the lower end of a stationary vertical supporting member C, while the plate B has its central portion attached to the upper end of a vertically movable shaft D. The latter is supported with freedom for vertical oscillatory movement by a helical spring E surrounding the shaft D and interposed between the hub like portion B' of the plate B, and a stationary subjacent annular support F through which the shaft D extends.

Figure 2:
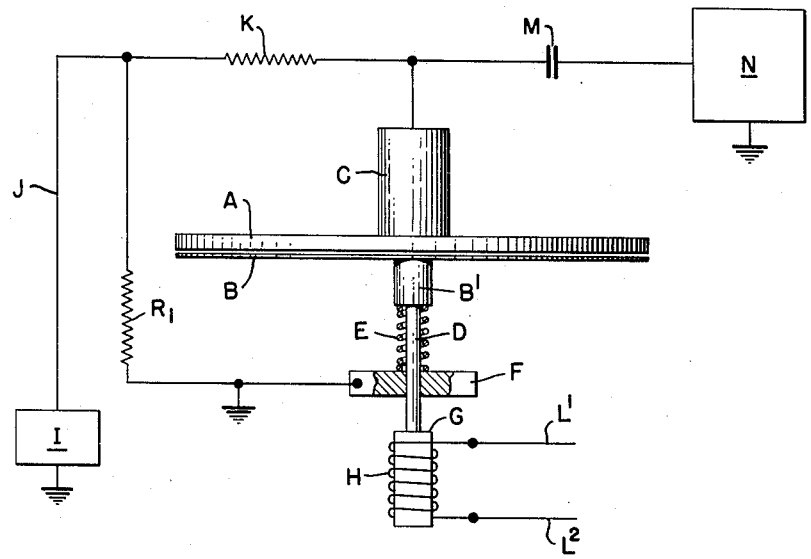
Fig. 2 is a somewhat diagrammatic elevation of a vibrating condenser converter.
Figure 1:
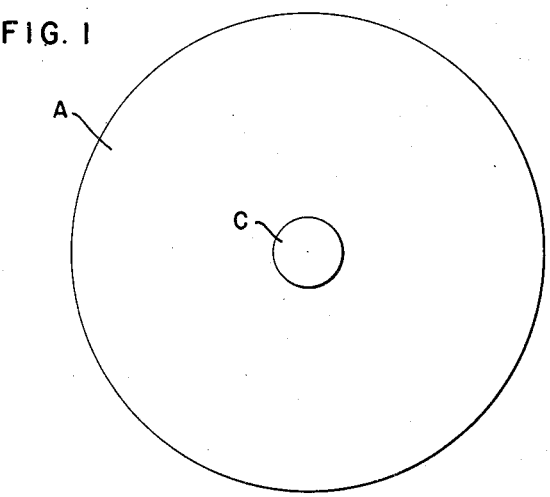
Fig. 1 is a plan view.

As diagrammatically shown, the lower end of the shaft D is connected to the upper end of a coaxial permanent magnet G. The latter is surrounded by a stationary solenoid coil H having its terminals connected to alternating current supply conductors L' and L². Said conductors may be connected to any available low voltage source of alternating current of suitable frequency, such, for example, as 60 cycles per second. Alternating current flowing through the coil H causes the plate B to move vertically toward and away from the plate A with the frequency of alternation of the current supplied by the conductors L' and L². In Fig. 1, I represents a source of minute unidirectional current which for example, may comprise an ionization chamber and a suitable direct current voltage supply. One terminal of the current source I is grounded, and the other terminal, J, is connected through a resistor K to the condenser plate A, and is connected through the resistor K and a coupling condenser M to apparatus N for amplifying and measuring alternating current transmitted to the apparatus through the coupling condenser M. The terminal J is connected to ground through a resistor R₁ and the plate B is also connected to ground through its resilient support E and associated stationary support F. On the assumption that the unidirectional output current of the device I is of the order of $10^{-15}$ ampere, the resistance of the resistor R₁ may well be of the order of one hundred megohms, and the resistance of the resistor K may be of the order of five megohms.

Under the assumed conditions, the plates A and B may each be an inch in diameter, and the plate A may be about a tenth of an inch thick, while the plate B may well be only three or four hundredths of an inch thick. In operation, the thickness of the space maintained between the stationary plate A and the vibrating plate B may well vary between a minimum of the order of .002″ and a maximum of the order of .04″. While the plate dimensions and the varying distance between the plates are not critical, their stated values are those existing in electrometers of the character disclosed in the above mentioned concurrently filed Mouzon application, and now in successful use. The particular vibrating condenser structure included in said electrometers and schematically illustrated herein, is illustrated and described, and the novel features thereof are claimed, in the concurrently filed application of Frederick W. Side, Serial No. 130,316, now Patent No. 2,632,791 of March 24, 1953.

The condenser plates A and B may be formed of various metals and in different ways. One practically satisfactory method of production, consists in turning the condenser plate out of cold rolled steel rod sections. Regardless of the manner in which they are formed, the juxtaposed surfaces of the two plates should be smooth and parallel, so as to permit their close spacing without risk of any portion of or projection from either plate engaging the other plate. In preparing the condenser plates for use, the surface of each plate is cleaned and is then plated in a conventional electro-plating operation, to give the plate a heavy coating of rhodium. Advantageously, the thickness of said heavy coating is approximately .0005″. The surface of each plate is then burnished and is given a thin second coating of rhodium in a second electro-plating operation. This completes the preparation of the plates, except that before the final assembly of the vibrating condenser converter, each plate is advantageously cleaned as by the application thereto first of petroleum ether, and then of methanol. The rhodium coating may be put on the condenser plates by the use of a conventional electro-plate process.

While the advantages obtained in the use of the present invention in vibratory condenser converters are especially important, the invention can be used with advantage in any condenser in which a relatively stable work function and contact potential are desirable.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A metallic condenser plate having its surface formed by a coating of rhodium and hence exhibiting a substantially constant work function notwithstanding exposure to the potentially contaminating constituents normally encountered in industrial atmospheres.

2. A condenser plate having a relatively constant work function, notwithstanding exposure to the potentially contaminating constituents normally encountered in industrial atmospheres, and formed by plating a steel plate body with rhodium.

3. A condenser plate having a relatively constant work function, notwithstanding exposure to the potentially contaminating constituents normally encountered in industrial atmospheres, and formed by plating a brass plate body first with nickel and then with rhodium.

4. A vibrating condenser converter for use in converting a minute unidirectional current into alternating current, comprising a stationary plate and a plate adjacent and movable toward and away from said stationary plate, and each having a rhodium coating plated on a plate body of a different metal and hence exhibiting a substantially constant work function notwithstanding exposure to the potentially contaminating constituents normally encountered in industrial atmospheres.

HARRY REESE, Jr.

References Cited in the file of this patent

UNITED STATES PATENTS

| Number | Name | Date |
|---|---|---|
| 1,952,854 | Gehrts | Mar. 27, 1934 |
| 2,053,090 | Lang et al. | Sept. 1, 1936 |
| 2,257,830 | Wolff et al. | Oct. 7, 1941 |
| 2,349,225 | Scherbatskoy | May 16, 1944 |
| 2,573,329 | Harris | Oct. 30, 1951 |

FOREIGN PATENTS

| Number | Country | Date |
|---|---|---|
| 551,638 | Great Britain | Mar. 3, 1943 |